May 15, 1956     G. KÄBISCH     2,745,868
PROCESS FOR THE PRODUCTION OF TRICHLOROACETONITRILE
Filed Feb. 8, 1954

INVENTOR:
GERHARD KÄBISCH,

BY Bailey, Stephens & Huettig
ATTORNEYS

United States Patent Office 2,745,868
Patented May 15, 1956

2,745,868

PROCESS FOR THE PRODUCTION OF TRICHLORO-ACETONITRILE

Gerhard Käbisch, Hanau (Main), Germany, assignor to Deutsche Gold- und Silber-Scheideanstalt vormals Roessler, Frankfurt am Main, Germany Application February 8, 1954, Serial No. 408,952

Claims priority, application Germany February 7, 1953

6 Claims. (Cl. 260—465.7)

The present invention relates to a novel process for the production of aliphatic nitriles containing up to 6 carbon atoms, which nitriles are completely chlorinated at least on the carbon atom adjacent to the nitrile group, from the corresponding unchlorinated or less chlorinated nitriles. The process according to the invention is especially adapted for the production of trichloro-acetonitrile by chlorinating acetonitrile or mono-chloro-acetonitrile.

A number of processes for the production of trichloro-acetonitrile are already known. In the thermal chlorination of acetonitrile the chlorination occurs at temperatures between 200 and 500° in the presence of catalysts such as active carbon or noble metal compounds. Aside from difficulties engendered by the necessity of containing chlorine at such high temperatures, chlorolysis can easily occur during such processes with the production of substantial quantities of carbon tetrachloride which not only lowers the yields obtainable but also renders it difficult to work up the reaction products. A further known process is a photochemical chlorination of acetonitrile which at least at the start of the reaction requires use of large quantities of light. A further disadvantage of such process is the extremely long time required for the induction of the reaction so that the major portion of the time required for the photochemical process is taken up by the initial induction period during which practically no conversion is effected. Also when the light source is outside of the reaction apparatus it is necessary to employ translucent apparatus which as is well known is difficult to maintain in large scale commercial operations. On the other hand when the light is supplied directly to the interior of the apparatus, it is necessary either to make all of the metal armatures of the light sources of materials resistant to attack by chlorine or to arrange them so that they are outside of the actual reaction space. In such instances also the apparatus employed is rather difficult to maintain.

In accordance with the invention it was found that nitriles, whose carbon atom adjacent the nitrile group is fully chlorinated, can be produced from chlorine free aliphatic nitriles or such nitriles poorer in chlorine in a smooth reaction with good yields when nitriles containing hydrogen chloride are employed as starting materials. Such process furthermore, contrary to the previously known processes, lends itself to the continuous production of chlorinated nitriles. The process according to the invention can, for example, be carried out by employing a nitrile such as acetonitrile which has been saturated with hydrogen chloride before the chlorination is initiated. The process however can also be carried out by treating the nitrile with a mixture of chlorine and hydrogen chloride. Very unexpectedly, the chlorination according to the invention is not dependent upon light and can be carried out in the total absence of light from beginning to end. The reaction starts with great rapidity without any induction period worth mentioning. The process according to the invention can therefore be carried out in non-translucent apparatus such as iron apparatus coated with chlorinated rubber, hard rubber or suitable synthetic resins, and no complicated arrangements for supplying light in the interior thereof are required.

In the production of trichloro-acetonitrile from acetonitrile it has been advantageous to saturate the acetonitrile with hydrogen chloride or at least to supply at least 20 volumes and preferably 50 volumes of hydrogen chloride per volume of acetonitrile. This can be accomplished as previously indicated by either saturating the acetonitrile before the chlorination is begun or by introducing a hydrogen chloride-chlorine mixture into pure acetonitrile.

Contrary to the previous conception that presence of the chlorinated product acts to accelerate the course of the reaction, it was found advantageous, especially when the process according to the invention is carried out continuously, to remove the trichloroacetonitrile continuously from the reaction mixture in which it is produced. The presence of an excess of chlorine over that reacted is also avoided as much as possible so that the gas leaving the reaction is substantially chlorine free. This is not only desirable in order to reduce the chlorine requirements to a minimum, but it was also found to favor a high speed of reaction so that good conversions can be maintained.

As has already been indicated, the process according to the invention is especially suited for continuous operation on a large commercial scale. The procedure employed can, for example, be as follows: Acetonitrile which was saturated with hydrogen chloride at 60° C. is chlorinated at temperatures between 50 and 80° C., preferably 55 to 75° C., until the reaction product has reached a density of about 0.9 g./cm.$^3$. From this point on as much trichloro-acetonitrile is drawn off over a column as is being produced by the chlorination and the reaction mixture is continuously replenished with fresh acetonitrile. The azeotropic mixture of the trichloro-acetonitrile and acetonitrile drawn off is worked up in a known manner by condensation of the trichloro-acetonitrile.

It is especially advantageous if the continuous chlorination of acetonitrile is carried out in two stages in one of which hydrogen chloride containing acetonitrile is chlorinated, while trichloro-acetonitrile in azeotropic mixture with acetonitrile, hydrogen chloride and a relatively small quantity of chlorine is drawn off in the vapor phase and after condensing the trichloro-acetonitrile and acetonitrile contained therein, passing the remaining gas into fresh acetonitrile in the other stage wherein the acetonitrile is preliminarily chlorinated and saturated with hydrogen chloride. The preliminarily treated acetonitrile of the latter stage is then supplied to the first mentioned stage where its chlorination is completed. The gas leaving the second mentioned stage is practically free of chlorine. Preferably the temperature employed in the second mentioned stage is lower than for the first mentioned stage.

Instead of employing acetonitrile as a starting material, mono chloroacetonitrile can be employed for the process according to the invention. The use of mono chloro-acetonitrile as a starting material is of advantage in that it does not form azeotropic mixtures with the trichloro-acetonitrile formed and consequently the latter is more easily separated from the reaction mixture.

In the accompanying drawings:

Fig. 1 diagrammatically shows an apparatus for the continuous production of chlorinated nitriles in a single stage process according to the invention; and Fig. 2 diagrammatically shows an apparatus for a continuous two stage process according to the invention.

The following examples will serve to illustrate the manner in which the process according to the invention can be carried out.

Example 1

Water free acetonitrile was saturated with hydrogen chloride at 60° C. in a usual extended chlorination tube. After the acetonitrile was saturated with hydrogen chloride, which could be recognized as having been reached when the bubbles of hydrogen chloride pass through the acetonitrile without decreasing in size, chlorine was also passed into the acetonitrile in a quantity such that the liquid remained as colorless as possible. After a little while the introduction of hydrogen chloride was stopped. The entire period during which the hydrogen chloride was introduced amounted at most to 30 minutes. The introduction of chlorine into the reaction mixture was continued until it had a density of about 1.19. About 25 to 40 hours was required for the chlorination. The trichloro-acetonitrile in the crude chlorinated reaction mixture was recovered by known procedures.

Example 2

Water free acetonitrile was placed in a chlorination tube and a mixture of HCl and Cl introduced, the ratio of HCl to Cl was maintained relatively high in the beginning and then the quantity of HCl was gradually reduced until it was completely eliminated from the gas stream introduced into the chlorination tube. The introduction of chlorine, however, was continued until the liquid reaction mixture had a density of about 1.1 to 1.2. Thereupon the chlorination was stopped and the trichloro-acetonitrile was recovered from the reaction mixture in manner known per se.

Example 3

Fresh mono-chloro-acetonitrile was saturated in a normal chlorination vessel with HCl and thereafter chlorine was passed into the resulting saturated solution at atmospheric pressure at a temperature of 60–70°. The introduction of chlorine was continued until 90% of the monochloro-acetonitrile had been converted to trichloro-acetonitrile. The latter was recovered from the reaction mixture by distillation.

Example 4

Acetonitrile was saturated with HCl and chlorinated in chlorination vessel 10 (Fig. 1) at temperatures between 50 to 80° C. The chlorine necessary for the chlorination and HCl were continuously introduced through conduits 13 and 14. At the beginning of the chlorination, column 11 was operated as a reflux condenser until the density of the reaction mixture reached 0.9 and thereafter column 11 was operated so as to permit as much trichloro-acetonitrile to leave its head as was produced in vessel 10 per unit of time. The acetonitrile in vessel 10 was continuously replenished by introducing fresh acetonitrile, previously saturated with HCl from container 12 over column 11 where it acted as a reflux. The trichloroacetonitrile was condensed in cooler 15. The process could be carried out continuously for any desired period of time. The reaction can be carried out continuously right from the start if it is so desired. In such instance however it is desirable that the initial charge of acetonitrile in vessel 10 already contain some trichloro-acetonitrile.

Example 5

A two stage chlorination of acetonitrile was carried out in an apparatus according to Fig. 2 by chlorinating acetonitrile saturated with HCl in the main chlorinating vessel 20 until the reaction mixture contained 15 to 40% by weight of trichloro-acetonitrile. During this period of operation column 21 served as a reflux condenser. Thereafter the temperature of column 21 was adjusted so that a quantity of trichloro-acetonitrile corresponding to that produced continuously left the head of such column and was passed through a cooler 22 where it was condensed and supplied to vessel 23. The remaining gas which mainly consisted of HCl containing a small quantity of chlorine was supplied over conduit 24 to a second reaction vessel 25 which was also supplied with fresh acetonitrile from container 27. The last traces of chlorine contained in the gas supplied to vessel 25 reacted therein with the acetonitrile. The remaining practically chlorine free gas left vessel 25 through reflux condenser 26 and was withdrawn through conduit 28. The reaction liquid in vessel 20 was continuously replenished by introducing over line 29 the preliminarily chlorinated acetonitrile which was also saturated with HCl produced in reaction vessel 25. The volume of reaction vessels 20 and 25 had a ratio of 4 to 1. The temperature maintained in reaction vessel 25 was about 57 to 67° C. whereas the temperature maintained in reaction vessel 20 was somewhat higher, namely 67 to 75° C. It is, however, possible although not as desirable to employ the same temperature in each reaction vessel. This two stage chlorination also can be carried out continuously right from the start if the initial charge of acetonitrile in vessel 20 already contains trichloro-acetonitrile.

I claim:

1. A process for the production of trichloro-acetonitrile which comprises contacting an acetonitrile compound selected from the group consisting of acetonitrile and monochloro-acetonitrile in admixture with hydrogen chloride with chlorine at temperatures between 50 and 80° C.

2. A process for the production of trichloro-acetonitrile which comprises contacting acetonitrile in admixture with hydrogen chloride with chlorine at temperatures between 50 and 80° C.

3. A process for the production of trichloro-acetonitrile which comprises contacting mono chloro acetonitrile in admixture with hydrogen chloride with chlorine at temperatures between 50 and 80° C.

4. A process for the production of trichloro-acetonitrile which comprises contacting a mixture of acetonitrile and hydrogen chloride in which the quantity of hydrogen chloride is at least 20 volumes per volume of acetonitrile with chlorine at a temperature between 55 and 75° C.

5. A process for the production of trichloro-acetonitrile which comprises contacting a mixture of acetonitrile and hydrogen chloride in which the quantity of hydrogen chloride is at least 20 volumes per volume of acetonitrile with chlorine at a temperature between 55 and 75° C. and continuously withdrawing the trichloro-acetonitrile formed from the reaction mixture in the vapor phase.

6. A process for the continuous production of trichloro-acetonitrile which comprises contacting chlorine with acetonitrile saturated with hydrogen chloride at temperatures between 50 and 80° C. in one reaction stage, continuously withdrawing the trichloro-acetonitrile formed in such stage in the vapor phase together with hydrogen chloride and a relatively small quantity of chlorine, condensing the trichloro-acetonitrile, passing the remaining gas containing hydrogen chloride and chlorine through acetonitrile at temperatures between 50 and 80° C. in a second stage to saturate such acetonitrile with hydrogen chloride and preliminarily chlorinate such acetonitrile and continuously introducing the preliminarily chlorinated acetonitrile which is saturated with hydrogen chloride into the first stage where its chlorination is completed.

References Cited in the file of this patent

UNITED STATES PATENTS

| | | |
|---|---|---|
| 2,231,838 | Lichty | Feb. 11, 1941 |
| 2,429,031 | Robinson | Oct. 14, 1947 |